June 2, 1964     D. P. GRUDOSKI     3,135,510
SUSPENSION SYSTEM FOR HOBBY-HORSE AND OTHER SEATING DEVICES
Filed Aug. 6, 1962     3 Sheets-Sheet 1

INVENTOR.
DANIEL P. GRUDOSKI
BY
ATTORNEYS

June 2, 1964    D. P. GRUDOSKI    3,135,510
SUSPENSION SYSTEM FOR HOBBY-HORSE AND OTHER SEATING DEVICES
Filed Aug. 6, 1962    3 Sheets-Sheet 2
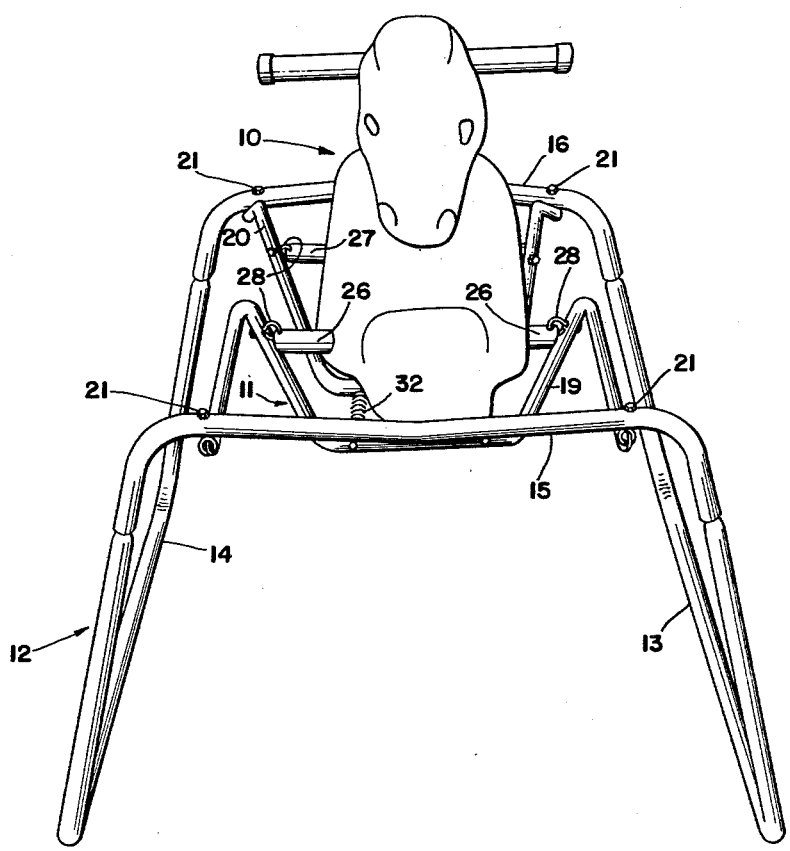
INVENTOR.
DANIEL P. GRUDOSKI
BY
ATTORNEYS June 2, 1964  D. P. GRUDOSKI  3,135,510
SUSPENSION SYSTEM FOR HOBBY-HORSE AND OTHER SEATING DEVICES
Filed Aug. 6, 1962  3 Sheets-Sheet 3

INVENTOR.
DANIEL P. GRUDOSKI
BY
Ely, Pearne & Gordon
ATTORNEYS

United States Patent Office 3,135,510
Patented June 2, 1964

3,135,510
SUSPENSION SYSTEM FOR HOBBY-HORSE AND OTHER SEATING DEVICES
Daniel P. Grudoski, Hartstown, Pa., assignor to Blazon, Inc., Akron, Ohio, a corporation of Ohio
Filed Aug. 6, 1962, Ser. No. 215,104
8 Claims. (Cl. 272—52)

This invention relates to a spring-suspended hobby-horse, chair, or like seating device, and more particularly to a stable, durable, and safe suspension that is capable of providing lively bucking, pitching, and rearing movements for a hobby-horse, for example, or a comfortable rocking and swinging movement for a lawn chair, all as the user intends.

Heretofore, hobby-horses have been constructed to simulate what a child imagines to be the movements of a real horse by employing springs and/or mechanical linkages in the suspending device. When mechanical linkages alone were employed, the hobby-horse was relatively stable but the ride was not "lively" since the action of the horse was generally confined to a fixed path. When springs alone were employed, the hobby-horse was suspended by connecting the springs directly to the body of the horse from the supporting base. Although the spring-suspended hobby-horse permits a "lively" ride that simulates the movements of a horse, this liveliness sometimes transcends the stability of the structure. This is particularly true where a small child becomes overly active or excited while riding the hobby-horse. The child in many instances will not be able to regain his balance after being pitched forwardly or rearwardly and may fall from the horse. Indeed, excess liveliness of a spring-suspended hobby-horse may frighten small children who attempt to use it.

Also, when prior art hobby-horses were provided with suspending springs, the springs were usually located in positions that were dangerously close to the arms and/or legs of the child riding the hobby-horse. Frequently a small child would be painfully pinched by a spring as the spring contracted. The springs of the prior art hobby-horses, moreover, were located in positions that would seriously injure a child if the springs failed or became detached from their mountings during a ride.

In the prior art attempts to combine linkages and springs for a hobby-horse, the result was to deaden and restrict action of the springs but otherwise the unsafe feature of a spring suspension remained. Additionally, the springs and linkages were usually connected in such a way as to make access to the hobby-horse extremely awkward or otherwise constitute a contraptiton in which the complex suspension would destroy any intended illusion of a galloping horse (or at least appear to do so in the minds of adult purchasers).

It is an object of the present invention to provide suspension for a hobby-horse or like riding device that will overcome the above problems and deficiencies of the prior art and, yet, insure a safe, lively ride.

A more specific object of the present invention is to provide a safe and sturdy suspension system for hobby-horses and the like but which is relatively unobtrusive and permits ready access to the device suspended therein.

A further object of this invention is to provide a sturdy and durable suspension for a hobby-horse or the like which can be compactly arranged for shipping and easily assembled for use.

A particular advantage of this invention is that the degree of liveliness of the suspension system is highly responsive to the actuating bodily movements of the user. Thus, in the case of a child who begins to be frightened by the lively action it has induced, the tendency of the child to "freeze" under such conditions quickly dampens the movement and restores the child's confidence. Because of the sensitive response to the bodily movements of the user, the suspension has also been discovered to be satisfactory for more sedate devices, such as various types of play chairs or "shoe-flies" for children or even lawn chairs for adults.

The foregoing and numerous additional objects, features, and advantages of the invention will become apparent and more fully understood from the following detailed description of the invention and the accompanying drawings in which:

FIGURE 2 is another perspective view of the hobby-horse shown in FIGURE 1, looking at the hobby-horse downwardly and from the front;

FIGURE 4 is a fragmentary sectional view showing a connection between the supporting frame and the suspension linkage in detail;

FIGURE 5 is a fragmentary sectional view showing the connection between a suspension linkage member and the hobby-horse in detail.

Figure 1:
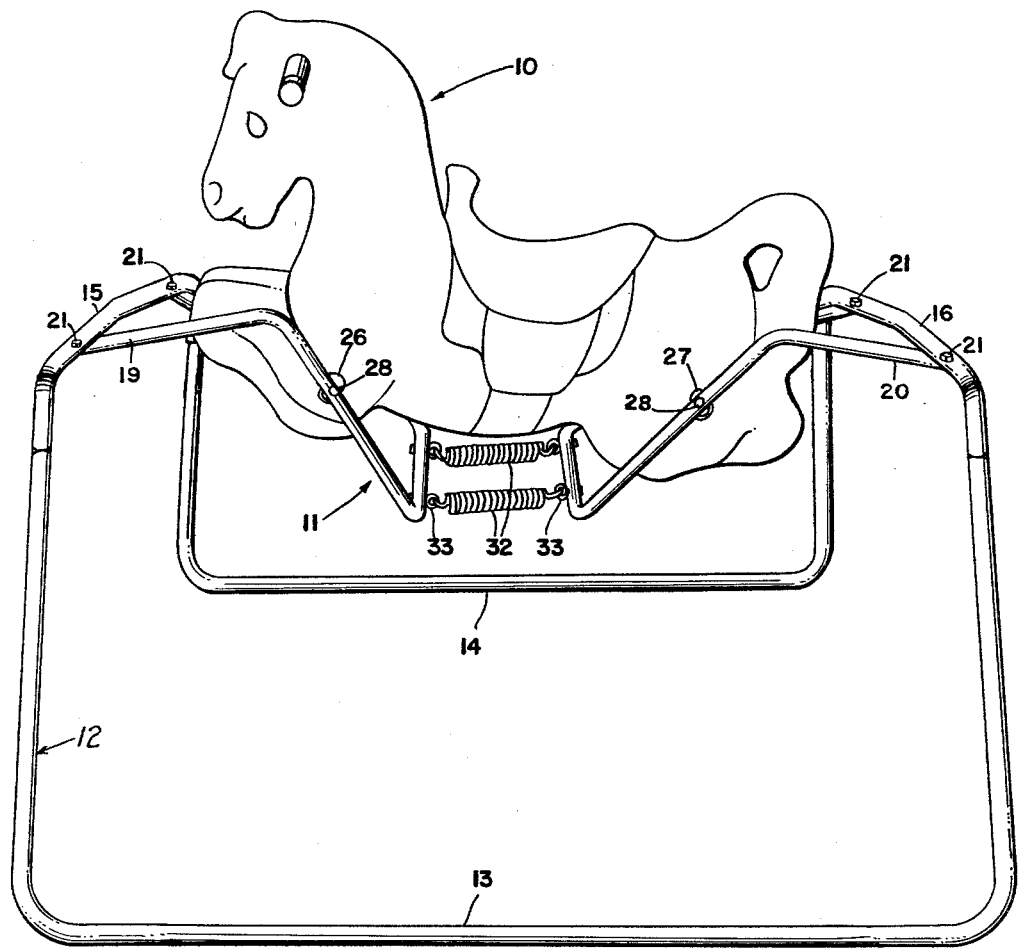
FIGURE 1 is a perspective view of a hobby-horse according to this invention, looking at the hobby-horse downwardly and from one side.

Referring now to FIGURES 1 and 2 of the drawings, a hobby-horse is illustrated which includes a body 10, a suspension system 11, and a frame 12.

The frame 12 comprises a pair of U-shaped side support members 13 and 14 and a pair of front and rear inverted U-shaped top cross pieces 15 and 16, respectively. The members 13 and 14 and cross pieces 15 and 16 are preferably made from hollow metal tubing. The top cross piece 15 is telescoped over the upwardly extending front leg portions of the side support members 13 and 14 to connect them at the front of the frame 12; the top cross piece 16 is telescoped over the upwardly extending rear leg portions of the side support members 13 and 14. In the preferred embodiment shown, the legs of the U-shaped supports 13 and 14 are slightly convergent and the legs of the cross pieces 15 and 16 are slightly divergent to provide a frame comprising a pair of parallel bottom bearing rails and a pair of transverse top pieces above the plane of the bottom rails connected together so as to constitute a single loop of tubing bent to provide four upwardly extending legs falling on the edges of a truncated pyramid. This provides, with the minimum number of linear elements, a support which is geometrically stable, in so far as it resists tipping from the rapidly shifting center of gravity of a child riding a hobby-horse supported therein. Due to the elasticity of the preferred metal tubing, stressed under load at the bends, especially, of the U-shaped members, however, the frame not only serves as a support but cooperates to become an active element in a spring-suspension system which increases in geometric stability as it flexes under load. Thus, under load, the outward flexing of the legs of the inverted U's constituting the top pieces 15 and 16 broadens the base of the frame 12 and the inward flexing of the U's constituting the side support members 13 and 14 lowers the center of gravity of the hobby-horse and child supported by the frame 12.

The suspension mechanism, which is indicated generally by the reference numeral 11, for the horse body 10 comprises front and rear pivoted U-shaped swing hangers 19 and 20, respectively. The legs of the hangers 19 and 20, as can be seen particularly in FIGURE 1, are bent downwardly so that the bases of these hangers 19 and 20 extend under the mid-portion of the body 10. As best seen in FIGURE 2, the legs of the hangers 19 and 20 are also outwardly divergent to provide outboard support for the horse body 10 mounted between the legs. The leg portions of the hangers 19 and 20 are each pivotally connected, respectively, to the front and rear top cross pieces 15 and 16 by eye bolts 21. As best shown in FIG. 2, in the preferred embodiment the front and rear top cross pieces 15 and 16 are essentially horizontal but their ends are bent downwardly to provide the telescopic connections with members 13 and 14 referred to above. The horizontal sections of the cross pieces 15 and 16 are also centrally bent in a horizontal plane (as indicated slightly in FIG. 2 and, more pronouncedly due to the perspective involved, in FIG. 1). The pivotal connection, through the eye-bolts 21, of the leg portions of the hangers 19 and 20 to the cross pieces 15 and 16, respectively, are preferably located in the horizontal sections of the cross pieces between the central bends and the downward bends of their ends. One such pivotal connection of a hanger leg to a cross piece by an eye-bolt 21 is shown in detail in FIGURE 4.

Referring now to FIGURE 4, a leg portion of the hanger 19 has a flattened end 22 with a hole 23 drilled therethrough. The shank of the eye bolt 21 extends through holes 24 drilled through the top cross piece 15 and is secured thereto by a suitable cap nut. The eye portion of the bolt 21 extends through the hole 23 to provide a pivotal connection permitting limited universal movement. The leg portions of the rear hanger 20 are similarly pivoted to the rear top cross piece 16 by additional eye bolts 21.

The horse body 10 is provided with front and rear hollow transverse support bars 26 and 27 which extend through the body 10. The hangers 19 and 20 are each pivotally connected respectively to the front and rear bars 26 and 27 by eye bolts 28, one of such pivotal connections being shown in detail in FIGURE 5. Referring now to FIGURE 5, a leg portion of the hanger 19 has holes 29 drilled therethrough which receives the shank of the eye bolt 28 fixed to the hanger 19 by a suitable cap nut. The eye portion of the bolt 28 is received by a hole 31 drilled into the bar 26. The hole 31 is made sufficiently large so that there may be limited universal pivotal movement of the bar 26 to the bolt 28 as well as pivotal movement of the shank of the bolt 28 in the holes 29. The leg portions of the rear hanger 20 are similarly pivoted to each end of the rear support bar 27.

Figure 3:
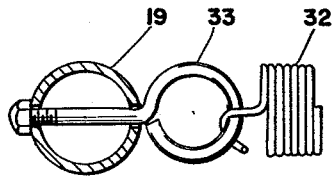
FIGURE 3 is a fragmentary sectional view showing in detail the connection of a spring to a linkage member.

The front and rear hangers 19 and 20 are resiliently connected to each other under the mid-portion of the body 10 by springs 32. As may be seen in detail in FIGURE 3, a spring 32 is crimped to the eye portion of an eye bolt 33, the shank of the eye bolt 33 being fixed to the hanger 19 by a suitable cap nut. The other end of each spring 32 is similarly connected to the rear hanger 20. Any number of springs 32 may be provided, depending upon the desired resiliency of the ride, the weight of the child using it, and for comfort, the natural frequency of the springs employed.

As may be seen from the drawings, the springs 32 are located well out of the way from the arms and legs of a child that rides the horse. If a spring 32 should fail or become disengaged from its connecting eye bolt 33, the spring should not seriously injure the child. Furthermore, in the unlikely event that all the springs 32 fail or become disengaged simultaneously, the hangers 19 and 20 will prevent the body from completely collapsing and permit the child to dismount without injury.

The hobby-horse according to this invention permits a lively and safe ride. The previously described structure permits an oscillating movement of the body of the horse governed by the movements of the child. If the child shifts his weight forward, the bar 26 will move downwardly, traversing an arc defined by the distance from the pivotal connection between the hanger 19 and the cross piece 15 to the pivotal connection between the hanger 19 and the bar 26. Simultaneously the bar 27 will move upwardly, traversing an arc defined by the distance from the pivotal connection between the hanger 20 and the cross piece 16 to the pivotal connection between the brace 20 and the bar 27. This movement of the bars 26 and 27 will cause the body of the horse to buck or pitch in a forward direction. Similarly, if the child shifts his weight in a rearward direction, the bar 26 will move upwardly and the bar 27 will move downwardly, traversing the aforementioned arcs. This movement of the bars 26 and 27 will cause the body of the horse to rear or pitch in a rearward direction.

To achieve this oscillating motion in the preferred form of the invention illustrated and described herein, the bars 26 and 27 should preferably be in a plane which is positioned above a plane passing through the pivotal connections between the hanger 19 and the cross piece 15 and between the hanger 20 and the cross piece 16, when the horse is unloaded and in a state of equilibrium.

As indicated at the outset, a suspension system made according to this invention is not limited to use for supporting hobby-horses, but may be employed for other spring-suspended devices upon which a person may be seated and induce more sedate swinging and rocking movement. An example of such a modification is a lawn chair as shown in FIGURE 6.

Figure 6:
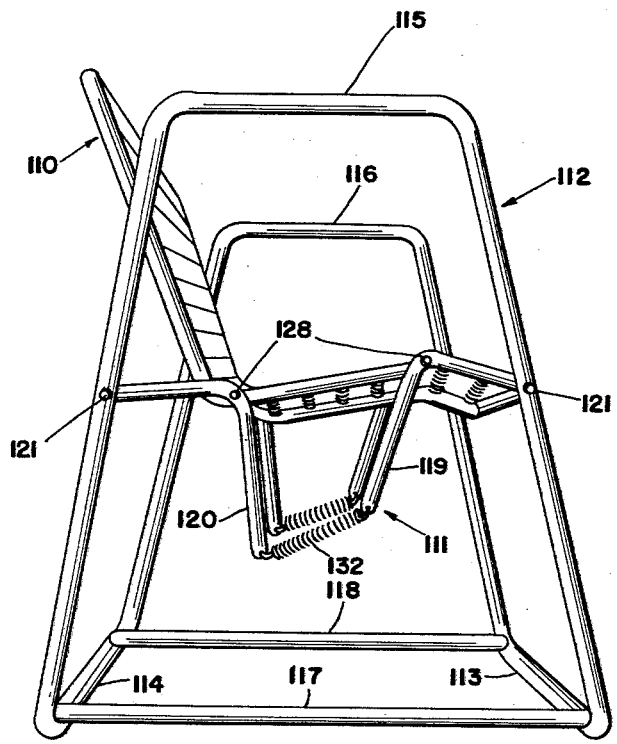
FIGURE 6 is a perspective view of a modification of a suspension made according to this invention showing its adaption to support a lawn chair, for example.

Referring to FIGURE 6, the lawn chair comprises a seat 110 having a back and deck formed in any suitable fashion, in the particular instance from bent tubular side members joined by slats, webbing, or the like to provide a seating surface. The seat 110 is supported by a suspension system of links and springs 111 (corresponding in principle to the system 11 employed for a hobby-horse) and a frame 112.

The frame 112 is comprised of U-shaped bottom members 113 and 114, the bases of which provide parallel bearing rails for the framework. The legs of the bottom members 113 and 114 are connected by inverted U-shaped transverse cross pieces 115 and 116 which, in this instance, may also serve as arms for the chair. As evident, the leg of the inverted U-shaped cross pieces are divergent so that the assembled structure envelopes, in barest continuous outline, a three-dimensional solid, which is geometrically stable with respect to the center of gravity of the person supported within the framework. Since the lawn chair is intended for relatively sedate use, suitable braces 117 and 118 may be employed to increase the rigidity of the framework and minimize its function as an actively resilient element of the spring-suspension system.

As in the case of the hobby-horse shown in FIGURES 1 to 5, open access to the seating device suspended in the frame 112 is provided in a direction transverse to the parallel bottom rails of the framework 111 between the ends defined by the transverse upper cross pieces and the framework legs connecting the upper cross pieces to the bottom rails. However, since, in the normal use of a chair, the person is seated facing the direction of access to it, rather than facing a direction transverse to the direction of access, as when seated astride a hobby-horse, the suspension system of links and springs 111 is mounted to oscillate in a direction transverse to the bottom members of the framework, rather than parallel to it, as in the hobby-horse suspension. As so mounted, the system 111 comprises a pair of U-shaped hangers 119 and 120 having downwardly bent legs which are pivotally connected at their ends to legs of the framework 112. Intermediate of the pivotal connection of the hangers 119 and 120 to the framework 112, the seat 110 is pivotally connected to the legs of the hangers 119 and 120 so as to be supported therebetween. The bases of the U-shaped hangers 119 and 120 extend beneath the deck of the seat 110 and are drawn toward each other by springs 132. Since the hangers are connected to the side legs of the framework 112 and no useful purpose would be served by limited universal movement of the pivotal connections of the hangers to the framework or to the seat 110, the pivotal connection may be made by through-bolts 121 and 128 as shown.

As indicated in FIGURE 6, the pivoted connections of the ends of the legs of the hangers 119 and 120 to the framework and to the chair may be arranged to position the deck of the seat 110 at the angle desired when the seat is at rest. As in the embodiment shown in FIGURES 1 to 5, the number, resilience, and natural frequency of the corresponding springs 132 may be varied to accommodate the expected load. When the suspension system made according to this invention is used for a lawn chair, the action of the seat is usually a simple swinging action responsive to the shifting of the user's weight, but may be any one of the various motions permitted by the linkage of the hangers 119 and 120 in combination with the springs 132.

In both the variations shown, the opposed hangers are usually identical to provide each hanger with an equivalent radius from the axis of its pivotal connection at the frame to the spring connections at the base of the hangers; the radius from that axis to the pivotal connection of the seating means to the legs of one hanger is also usually equal to the corresponding radius of the other hanger. Either of these radii of one hanger may be different from the corresponding radii of the other hanger so that, when the suspension system is actuated by the shifting weight of the user, a somewhat different action will be obtainable.

In the light of the above teachings, many other modifications and variations of the invention will become apparent to those skilled in the art. It is to be understood, therefore, that within the scope of the appended claims, the invention may be practiced otherwise than as specifically disclosed.

What is claimed is:

1. Suspended seating means comprising a frame, a seating member, and a linkage supporting said member in said frame, in which combination said frame is provided with a pair of opposite, upwardly-extending end portions and permits access therebetween to said seating member, said linkage comprises a pair of hangers, each hanger being pivotally connected to an end portion of said frame and extending toward the other hanger of the pair, and resilient means connecting ends of the hangers not connected to said frame, and said seating member is pivotally connected to each of said hangers between the connection of the hanger to the frame and the point of connection to the other hanger through said resilient means.

2. Suspended seating means as defined in claim 1 in which each of said hangers includes a pair of legs, the pair of legs of one of said hangers being pivoted to one of said pair of end portions and the pair of legs of the other of said hangers being pivotally connected to the other end portion of said pair, and normally extending downwardly from their pivotal connections to said frame to their connection by said resilient means whereby said seating member will be suspended above said resilient means connecting said hangers.

3. Suspended seating means as defined in claim 2 in which said legs are elements of a U-shaped hanger and are integrally connected to each other by a base so that the pair of legs of each hanger will move in unison, and said resilient means includes a tension spring normally urging the bases of the U-shaped hangers toward each other.

4. Seating means as defined in claim 3 in which the legs of each hanger are bent downwardly adjacent the points of pivotal connection to said seating member to place said springs substantially below said seating member.

5. Seating means as defined in claim 4 constituting a hobby-horse in which said seating member is a simulated horse body.

6. A hobby-horse as defined in claim 5 in which said frame is comprised of a pair of tubular bottom members, each having a bottom rail portion integral with a pair of upstanding legs and a pair of cross pieces having the shape of an inverted U, the downwardly depending legs of said cross pieces being connected to the legs of said bottom members to provide the said upwardly extending end portions of said frame, pivotal connection of said hangers to said cross pieces being transverse to said cross pieces and permitting access to said horse body between said end portions.

7. Seating means as defined in claim 4 constituting a chair in which said seating member includes a chair body comprising a back and deck.

8. A chair comprising a frame of tubing connected to form a continuous loop bent to provide parallel bottom rail portions, transverse cross pieces, and upstanding frame leg portions, each cross piece being connected to said rail portions by a pair of said frame leg portions and thereby defining opposed frame end portions each comprised of a cross piece and a pair of frame leg portions; hangers having leg portions and bent portions, said hanger leg portions each being pivotally connected to frame leg portions for movement about axes transverse to the planes of said frame end portions, resilient means extending between the bent portions of said hangers and normally drawing a leg portion of one hanger pivotally connected to one frame leg toward the leg portion of another hanger connected to the other frame leg of a pair of frame legs in a frame end portion, a chair body comprising a back and deck and pivotally connected to each of said hangers between the pivotal connections of the hanger to said frame leg portion and said resilient means for movement about axes transverse to the planes of said end portions, whereby said chair body may be resiliently oscillated between and in a direction parallel to said frame end portions.

References Cited in the file of this patent
UNITED STATES PATENTS 2,551,632    Pichler    May 8, 1951
2,814,490    Connet    Nov. 26, 1957